Oct. 31, 1950   E. D. LILJA   2,527,830
FLYWHEEL DAMPENER FOR SERVOS
Original Filed July 25, 1945
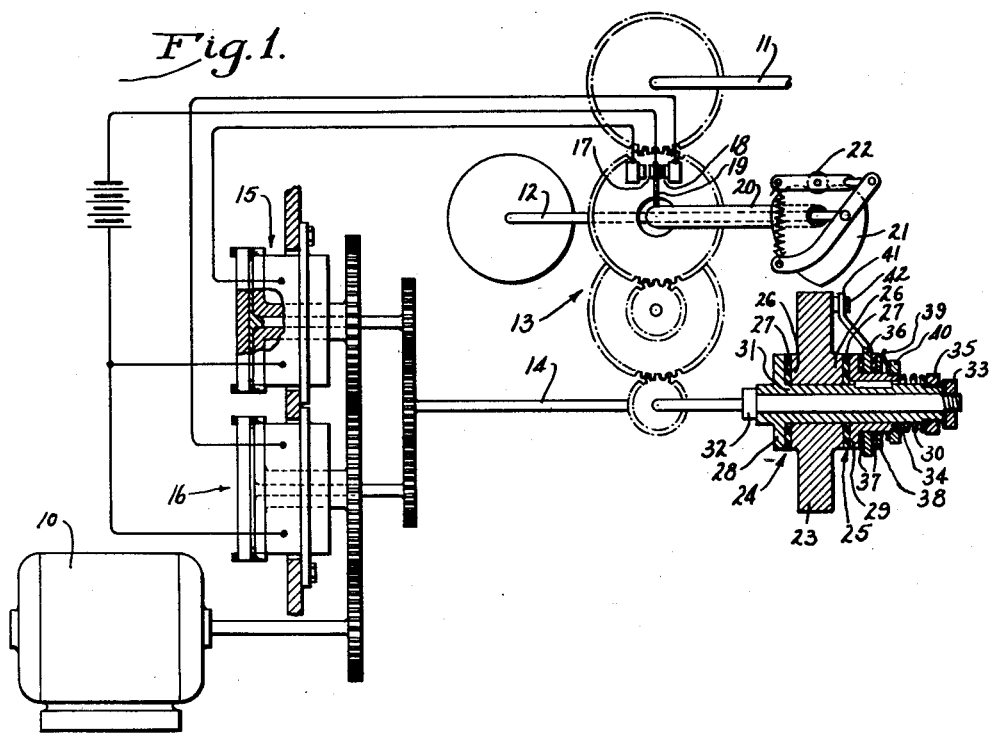
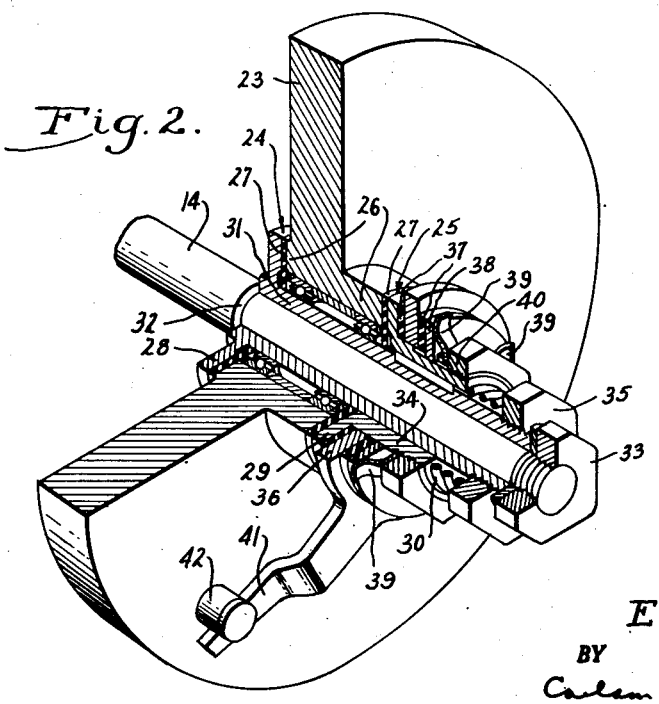
INVENTOR.
Edgar D. Lilja
BY
ATTORNEYS Patented Oct. 31, 1950

2,527,830

UNITED STATES PATENT OFFICE 2,527,830

FLYWHEEL DAMPENER FOR SERVOS

Edgar D. Lilja, Rockford, Ill., assignor to Barber-Coleman Company, Rockford, Ill., a corporation of Illinois Original application July 25, 1945, Serial No. 607,039. Divided and this application December 18, 1948, Serial No. 66,086

4 Claims. (Cl. 74—574)

This invention relates to servo actuators having a power rotated element connected to a flywheel through a slip coupling so that the inertia of the flywheel is utilized to stabilize operation of the servo and prevent hunting.

One object is to combine a slip coupled flywheel with a means operable automatically under certain conditions to impose an additional torque resisting relative slipping of the flywheel and rotary element.

Another object is to produce a supplemental torque by means of a second friction coupling which becomes operative after a substantial slipping of the first coupling.

The invention also resides in the novel construction and arrangement of the two couplings.

Other objects and advantages of the invention will become apparent from the following detailed description taken in connection with the accompanying drawings, in which Figure 1 is a schematic view and wiring diagram of a servo actuator equipped with a flywheel coupled to the servo in accordance with the present invention, the flywheel being shown in diametrical section.

Fig. 2 is a perspective view of the flywheel broken away and shown in section.

In the drawings, the invention is shown for purposes of illustration embodied in an electric servo actuator for transmitting power derived from an electric motor 10 to a load shaft 11 so as to cause the latter to follow closely the motions of a control shaft 12. The shaft 11 is driven through speed reduction gearing 13 from a shaft 14 which is rotated by the motor in one direction or the other depending on which of two electromagnetic friction clutches 15 and 16 is energized. The windings of these clutches are controlled by switches 17 and 18 having spaced contacts carried by a gear of the train 13 rotating in unison with the load shaft. The intermediate or common contact of the switches is on a tongue 19 fast on a sleeve 20 which carries a heart-shaped cam 21 whose follower 22 is mounted on the control shaft 12 and spring urged against the cam.

In the servo thus described, positional disagreement between the control and load shafts results in closure of one of the switches 17, 18 and energization of the proper clutch to drive the load shaft in the direction of the control shaft until the depression in the cam 21 is again presented to the follower 22 thereby opening both switches. As a result, the load shaft is power actuated to follow the movements of the control shaft.

To stabilize the operation of the servo, a high speed element of the transmission, the shaft 14 in this instance, is subjected to the action of a flywheel 23 connected to the shaft 14 through a slip coupling which resists relative rotation between the flywheel and shaft with a torque which is correlated in magnitude with the characteristics of the servo actuator and which remains approximately constant. In the form shown, this torque is derived frictionally by couplings or clutches 24 and 25 formed by the ends of hubs 26 on the flywheel coacting with flanges 28 and 29 rotatable with the servo element 14. The flywheel is journaled through ball bearings on a sleeve 31 which is carried by the shaft 14 and clamped to the latter between a collar 32 and a nut 33. The flywheel hubs 26 are forced against disks 27 of friction material by the flanges 28 and 29 which are urged toward each other by a compression spring 30. The flange 28 is on the sleeve 31, while the flange 29 is rigid with a sleeve 34 splined on the sleeve 31. The spring 30 acts between one end of the sleeve 34 and an adjustable collar 35 screwed onto the sleeve 31. It will be apparent that the couplings 24 and 25 will resist relative rotation between the flywheel and the shaft 14 with a torque which, except for inherent small changes in the coefficient of the friction facings, will be substantially constant irrespective of the speed of relative slipping between the clutch elements.

By virtue of its friction connection with the driving train, the flywheel 23 constitutes a rotating friction device which acts continuously to overcome any tendency of the parts to oscillate and produce hunting. That is to say, it acts frictionally to resist each energy impulse imparted to the system by engagement of one of the clutches. Similarly, the energy stored in the flywheel tends to carry the load and thereby resist stopping of the driven parts when the clutch is disengaged. As a result of this action, the flywheel tends automatically to attain the average speed of the parts and is very effective in damping out any hunting tendency. To obtain this damping action, while at the same time causing the driven element to follow closely and precisely the movements of the control element 12, the effective moment of inertia of the flywheel should be four to ten times greater than that of the driving gear train and the connected parts.

Since the maximum torque which can be applied frictionally to the flywheel is substantially constant for any given adjustment of the spring 30, the flywheel is best suited to stabilize the servo during accelerations and decelerations of certain magnitudes. Thus, a friction coupling which will damp out small accelerations quickly will not be as effective when the servo speed deviates widely and rapidly. To overcome this, the present invention contemplates imposing on the servo driven element an additional drag which is also derived by flywheel action and which is ineffectual or substantially so at low accelerations but becomes effective automatically in response to accelerations of substantial magnitude.

This additional effect is derived frictionally by interposing a second frictional coupling between the shaft 14 of the servo actuator and the flywheel 23. To this end, a member in the form of a flat ring 36 journaled on the exterior of the sleeve 34 is engaged on opposite sides by rings 37 of friction material disposed inside of the flange 29 and a ring 38 slidable axially on the sleeve 34. The latter ring is constantly urged toward the ring 36 by bent arms 39 on a spring disk axially compressed by a collar 40 threaded onto the end of the sleeve 34.

Rigid with and projecting outwardly from the ring 36 is an arm 41 whose outer end lies in the path of a pin 42 on the flywheel. A lost motion connection is thus formed between the flywheel 23 and the ring 36 so that, when the angular slack in the connection is taken up, additional friction clutch couplings will be established between the flywheel and the shaft 14 producing a torque which supplements that of the main couplings 24 and 25 in resisting relative rotation between the flywheel and shaft. These auxiliary couplings normally remain ineffectual, but become effective when due to a wide change in the speed of the shaft 14, the main couplings slip sufficiently to establish a driving connection between the flywheel and the ring 36. In this way, the friction coupled flywheel is rendered more effective in damping out shaft oscillations of abnormal amplitudes and, therefore, is better suited to minimize hunting in servos subjected to rapid and large changes in speed.

Being derived frictionally through a spring force of constant magnitude, the supplemental torque produced automatically as above described is always substantially constant; whereas the excessive accelerations and decelerations may vary widely. Therefore, more effective stabilization may be obtained by varying the supplemental torque in accordance with the difference between the flywheel and shaft speeds. While this may be accomplished mechanically in various ways, it is best achieved through the use of a magnetic coupling which develops a restraining torque in response to slippage between the flywheel and shaft 14 and proportional to the amount of such slippage. Preferably, the magnetic coupling operates by the generation of eddy currents in one of two magnetic members rotatable respectively with the flywheel and the shaft 14.

By providing a coupling such as those described above capable of exerting a constant torque tending to hold the flywheel and shaft against relative turning and supplementing this coupling with one whose torque increases as the rate and duration of acceleration increases, a more effective stabilization is achieved under widely varying service conditions and the flywheel stabilizer is adapted automatically to suit prevailing conditions. This results from the fact that the coupling torque increases with the speed differential between the flywheel and the servo shaft, thereby bringing the flywheel up to speed sooner than would be possible with a constant torque coupling of a magnitude satisfactory for low accelerations and approximately constant speed operation.

This application is a division of my copending application Serial No. 607,039, filed July 25, 1945, now abandoned.

I claim as my invention:

1. The combination with a servo actuator having a power driven rotary element of, a flywheel having a friction driving connection with said element, a rotary member having a lost motion connection with said flywheel, and means providing a friction coupling between said member and said rotary element operable to impose additional friction on the flywheel when the slack in said lost motion connection has been taken up by relative angular displacement of the flywheel and member.

2. In a servo actuator having a power driven rotary element, the combination of, a flywheel, a friction coupling having axially engageable parts respectively rotatable with said element and said flywheel, spring means normally urging said parts into frictional gripping engagement to develop a predetermined torque resisting turning of the flywheel relative to said element, a member mounted for angular displacement relative to said rotary element, a second friction coupling having axially engageable parts respectively rotatable with said element and said member, spring means normally urging the parts of said second coupling into frictional gripping engagement to develop a second predetermined torque, and means providing a rotary lost motion connection between said member and said flywheel whereby said first mentioned torque is imposed on the flywheel during displacement thereof until the slack in said lost motion connection is taken up after which said second torque becomes effective to resist further displacement of the flywheel relative to said element.

3. In a servo actuator having a power driven rotary element, the combination of, a flywheel, a normally engaged friction coupling having parts respectively rotatable with said element and said flywheel, a member mounted for angular displacement relative to said rotary element, a second friction coupling having parts respectively rotatable with said element and said member and normally urged into frictional gripping engagement to develop a second predetermined torque, and means providing a rotary lost motion connection between said member and said flywheel permitting relative turning between the two through a substantial arc.

4. In a servo actuator having a power driven rotary element, the combination of, a flywheel, a friction coupling having parts respectively rotatable with said element and said flywheel, spring means normally urging said parts into frictional gripping engagement to develop a predetermined torque resisting turning of the flywheel relative to said element, a member mounted for angular displacement relative to said rotary element, a second friction coupling having parts respectively rotatable with said element and said member, a second spring means normally urging the parts of said second coupling into frictional gripping engagement to develop a second predetermined torque, and means providing a rotary lost motion connection between said member and said flywheel.

EDGAR D. LILJA.

REFERENCES CITED

The following references are of record in the file of this patent:

UNITED STATES PATENTS

| Number | Name | Date |
|---|---|---|
| 1,981,167 | Front | Nov. 20, 1934 |
| 2,065,601 | Meyer | Dec. 29, 1936 |
| 2,333,122 | Prescott | Nov. 2, 1943 |
| 2,360,157 | Olson | Oct. 10, 1944 |
| 2,383,516 | Solomon | Aug. 28, 1945 |